(12) United States Patent
Lin (10) Patent No.: US 9,403,404 B2
(45) Date of Patent: Aug. 2, 2016

(54) CARBON FIBER RIM AND METHOD OF MANUFACTURING THE SAME

(71) Applicant: Po-Chien Lin, Taichung (TW)

(72) Inventor: Po-Chien Lin, Taichung (TW)

( * ) Notice: Subject to any disclaimer, the term of this patent is extended or adjusted under 35 U.S.C. 154(b) by 255 days.

(21) Appl. No.: 14/166,850

(22) Filed: Jan. 28, 2014

(65) Prior Publication Data

US 2015/0210111 A1   Jul. 30, 2015

(51) Int. Cl.
*B60B 21/08* (2006.01)
*B29C 70/86* (2006.01)
*B29C 67/00* (2006.01)
*B60B 21/02* (2006.01)
*B60B 5/02* (2006.01)
*B29L 31/32* (2006.01)
*B29L 31/30* (2006.01)
*B29C 35/08* (2006.01)

(52) U.S. Cl.
CPC .............. *B60B 21/08* (2013.01); *B29C 67/0088* (2013.01); *B29C 70/86* (2013.01); *B29C 2035/0855* (2013.01); *B29L 2031/3091* (2013.01); *B29L 2031/32* (2013.01); *B60B 5/02* (2013.01); *B60B 21/025* (2013.01); *B60B 2310/204* (2013.01); *B60B 2310/208* (2013.01); *B60B 2310/30* (2013.01); *B60B 2310/306* (2013.01); *B60B 2320/10* (2013.01); *B60B 2360/3416* (2013.01); *B60B 2900/111* (2013.01); *B60B 2900/311* (2013.01); *B60B 2900/321* (2013.01); *B60Y 2200/13* (2013.01)

(58) Field of Classification Search
CPC ...... B60B 21/00; B60B 21/02; B60B 21/025; B60B 21/04; B60B 21/08
USPC ............. 301/95.101, 95.102, 95.103, 95.104, 301/95.106, 95.107, 95.108, 95.11
See application file for complete search history.

(56) References Cited

U.S. PATENT DOCUMENTS

| | | | | |
|---|---|---|---|---|
| 6,048,035 A * | 4/2000 | Chen | ..................... | B06B 21/062 301/30 |
| 6,186,598 B1 * | 2/2001 | Chen | ..................... | B60B 1/041 301/58 |
| 6,216,758 B1 * | 4/2001 | Chen | ..................... | B60B 1/041 152/379.4 |
| 6,293,629 B1 * | 9/2001 | Chen | ..................... | B60B 1/041 301/58 |
| 6,347,839 B1 * | 2/2002 | Lew | ..................... | B29C 70/345 301/95.102 |
| 6,460,939 B1 * | 10/2002 | Claes | ..................... | B60B 21/025 301/95.101 |
| 7,029,074 B2 * | 4/2006 | Chen | ..................... | B60B 1/041 301/58 |
| 7,614,706 B2 * | 11/2009 | Meggiolan | ............ | B29C 70/446 301/95.102 |
| 7,883,157 B2 * | 2/2011 | Theilig | .................. | B29C 70/84 301/64.704 |
| 8,162,408 B2 * | 4/2012 | Yang | ..................... | B60B 1/003 301/95.102 |
| 8,652,380 B2 * | 2/2014 | Lew | ..................... | B29C 70/345 156/184 |
| 8,877,292 B2 * | 11/2014 | Lee | ..................... | B05D 5/083 427/309 |

(Continued)

*Primary Examiner* — Hau Phan
*Assistant Examiner* — Jacob Meyer (57) ABSTRACT

A carbon fiber rim contains: a body, two clamping pieces, and a plurality of covering layers. The body includes a recessed fixing face defined on an outer diameter thereof so as to fix a tire and two connecting faces formed on two sides thereof so as to align with the two clamping pieces, and each clamping piece is a circular loop and corresponds to a profile of an outer peripheral side of the body. The plurality of covering layers are fitted and surround around the body and the two clamping pieces. Thereby, the two clamping pieces are fixed on the two connecting faces of the body by using the plurality of covering layers so that the two brake blocks do not contact with the body directly and brake a bicycle wheel via the two clamping pieces.

3 Claims, 8 Drawing Sheets

(56) References Cited

U.S. PATENT DOCUMENTS

| | | | | |
|---|---|---|---|---|
| 8,905,491 B2* | 12/2014 | Koshiyama | ............. | B60B 1/003 301/95.102 |
| 9,044,998 B2* | 6/2015 | Mercat | ...................... | B60B 5/02 |
| 9,108,461 B2* | 8/2015 | Kismarton | .............. | B60B 3/082 |
| 9,216,613 B2* | 12/2015 | Poertner | ................ | B60B 21/08 |
| 9,242,421 B2* | 1/2016 | Tsai | ...................... | B29C 70/747 |
| 2004/0090110 A1* | 5/2004 | Bernardi | ................ | B60B 21/08 301/95.101 |
| 2004/0095014 A1* | 5/2004 | Veux | ..................... | B60B 21/025 301/58 |
| 2004/0227393 A1* | 11/2004 | Meggiolan | ............ | B29C 70/446 301/95.102 |
| 2005/0210675 A1* | 9/2005 | Price | .................... | B60B 21/025 29/894.31 |
| 2005/0236885 A1* | 10/2005 | Chen | ....................... | B60B 1/041 301/95.104 |
| 2006/0197369 A1* | 9/2006 | Chiu | ........................ | B60B 5/02 301/6.3 |
| 2007/0029868 A1* | 2/2007 | Chen | ..................... | B60B 1/0215 301/95.102 |
| 2007/0102992 A1* | 5/2007 | Jager | ..................... | B29C 70/462 301/30 |
| 2008/0174168 A1* | 7/2008 | Yang | ....................... | B60B 1/003 301/95.102 |
| 2008/0277998 A1* | 11/2008 | Chen | ....................... | B60B 1/041 301/95.104 |
| 2009/0079257 A1* | 3/2009 | Theilig | ................... | B29C 70/84 301/56 |
| 2009/0115240 A1* | 5/2009 | Slate | ...................... | B60B 21/025 301/95.104 |
| 2009/0195055 A1* | 8/2009 | Chen | ....................... | B60B 1/041 301/95.104 |
| 2009/0250995 A1* | 10/2009 | Tsai | .......................... | B60B 5/02 301/95.102 |
| 2009/0322145 A1* | 12/2009 | Rinard | ................... | B60B 1/041 301/58 |
| 2010/0270852 A1* | 10/2010 | Chen | ...................... | B60B 1/041 301/33 |
| 2010/0301663 A1* | 12/2010 | Kismarton | ................ | B60B 5/02 301/64.704 |
| 2011/0001349 A1* | 1/2011 | Mercat | ..................... | B60C 3/02 301/95.104 |
| 2011/0089750 A1* | 4/2011 | Colegrove | ................ | B60B 5/02 301/95.102 |
| 2011/0089751 A1* | 4/2011 | Saillet | ..................... | B60B 5/02 301/95.103 |
| 2011/0233005 A1* | 9/2011 | Lee | .......................... | B60T 1/06 188/24.13 |
| 2012/0006470 A1* | 1/2012 | Lew | ...................... | B29C 70/345 156/193 |
| 2012/0013172 A1* | 1/2012 | Mercat | .................... | B60B 5/02 301/95.102 |
| 2012/0056468 A1* | 3/2012 | Tsai | ........................ | B60B 5/02 301/95.103 |
| 2012/0292980 A1* | 11/2012 | Lee | .......................... | B60B 5/02 301/95.102 |
| 2013/0057050 A1* | 3/2013 | Matsui | ..................... | B60B 5/02 301/95.102 |
| 2013/0214586 A1* | 8/2013 | Kismarton | ................ | B60B 5/02 301/58 |
| 2013/0309407 A1* | 11/2013 | Lee | ........................ | B05D 5/083 427/384 |
| 2014/0001820 A1* | 1/2014 | Kismarton | .............. | B60B 3/082 301/55 |
| 2014/0117745 A1* | 5/2014 | Wilke | .................... | B60B 21/08 301/6.9 |
| 2014/0167384 A1* | 6/2014 | Chuang | ................... | B62K 3/02 280/281.1 |
| 2014/0374269 A1* | 12/2014 | Lee | .......................... | B60B 5/02 205/159 |
| 2015/0015125 A1* | 1/2015 | Webber | ................... | B60B 1/041 310/67 A |
| 2015/0096672 A1* | 4/2015 | Tsai | ...................... | B29C 70/747 156/242 |
| 2015/0314640 A1* | 11/2015 | Kismarton | .............. | B60B 3/082 301/58 |
| 2015/0360510 A1* | 12/2015 | Poertner | ................ | B60B 1/003 301/6.9 |

\* cited by examiner

CARBON FIBER RIM AND METHOD OF MANUFACTURING THE SAME

FIELD OF THE INVENTION

The present invention relates to a carbon fiber rim and a method of manufacturing the same which has two clamping pieces covered on a body by a plurality of covering layers so as to protect the carbon fiber rim and to enhance service life of the carbon fiber rim.

BACKGROUND OF THE INVENTION

Carbon fiber materials are used to manufacture many parts of bicycles because their high reinforcement, rigidity and light weight. The carbon fiber materials have been promoted to bicycle markets through following four steps:

1. To front fork and rear stays, wherein a requirement of a support force of the front fork and the rear stays focuses on light weight in this step. The manufacturers therefore focus on producing light-weight front fork and rear stays.
2. To crank, seat post and handle bar, wherein a high support force of the crank, the seat post and the handle bar is indispensable for bicycles in this step. Accordingly, manufacturers develop related technologies to produce high rigid crank, seat post and handle bar.
3. To frame, wherein customers require the fame with aesthetics appearance, so manufactures develop good-looking frame at this stage.
4. To rim, wherein a bicycle made of carbon fiber materials are popular at this stage, so manufacturers research and develop related parts of a bicycle made of carbon fiber materials, such as carbon fiber rim.

However, such a carbon fiber rim rubs with brake blocks of a wheel directly during riding bicycle, thus damaging the carbon fiber rim easily.

The present invention has arisen to mitigate and/or obviate the afore-described disadvantages.

SUMMARY OF THE INVENTION

The primary object of the present invention is to provide a carbon fiber rim and a method of manufacturing the same which has two clamping pieces covered on by a plurality of covering layers so as to protect the carbon fiber rim and to enhance service life of the carbon fiber rim.

To obtain the above objective, a carbon fiber rim provided by the present invention contains: a body, two clamping pieces, and a plurality of covering layers.

The body includes a recessed fixing face defined on an outer diameter thereof so as to fix a tire and two connecting faces formed on two sides thereof so as to align with the two clamping pieces, and each clamping piece is a circular loop and corresponds to a profile of an outer peripheral side of the body.

The plurality of covering layers are fitted and surround around the body and the two clamping pieces.

Thereby, the two clamping pieces are fixed on the two connecting faces of the body by using the plurality of covering layers so that the two brake blocks do not contact with the body directly and brake a bicycle wheel via the two clamping pieces.

Also, a method of manufacturing carbon fiber rim provided by the present invention contains steps of:

forming a body, wherein the body of a carbon fiber rim is formed by a forming machine, and the body includes a recessed fixing face defined on an outer diameter thereof and two connecting faces formed on two sides thereof;

molding, wherein two clamping pieces are aligned with two connecting faces on two sides of the body, and a plurality of covering layers are fitted and equidistantly surrounded around the body and the two clamping pieces;

positioning, wherein a binding ring is fastened on a recessed fixing face on an outer diameter of the body so that the plurality of covering layers align with plural predetermined positions of each clamping piece;

forming once more, wherein the plurality of covering layers are microwave heated by a carbon fiber molding machine so that the plurality of covering layers are molded to position the two clamping pieces on the body;

finishing, wherein a finished carbon fiber rim is removed from the carbon fiber molding machine, and the binding ring is removed.

DETAILED DESCRIPTION OF THE PREFERRED EMBODIMENTS

A carbon fiber rim and a method of manufacturing the same has two clamping pieces covered on a body by a plurality of covering layers so as to protect the carbon fiber rim and to enhance service life of the carbon fiber rim.

With reference to FIGS. 1-5, a carbon fiber rim according to a preferred embodiment of the present invention comprises: a body 1, two clamping pieces 2, and a plurality of covering layers 3.

The body 1 includes a recessed fixing face 11 defined on an outer diameter thereof so as to fix a tire 4 and two connecting faces 12 formed on two sides thereof so as to align with the two clamping pieces 2, and each clamping piece 2 is a circular loop and corresponds to a profile of an outer peripheral side of the body 1 (a width and a fixing direction of each clamping piece 2 match with those of each of two brake blocks 5; and each clamping piece 2 is made of aluminum magnesium alloy or composite material).

The plurality of covering layers 3 are fitted and surround around the body 1 and the two clamping pieces 2.

Thereby, the two clamping pieces 2 are fixed on the two connecting faces 12 of the body 1 by using the plurality of covering layers 3 so that the two brake blocks 5 do not contact with the body 1 directly and brake a bicycle wheel via the two clamping pieces 2, thus protecting body 1.

Each clamping piece 2 includes plural recessed sections 21 for receiving the plurality of covering layers 3, such that each covering layer 3 has a thickness formed thereon so as to flush with each clamping piece 2.

Preferably, each connecting face 12 of the body 1 has a groove 121 defined thereon and corresponding to each clamping piece 2 so that each clamping piece 2 is mounted on each connecting face 12 of the body 1 by ways of each groove 121, thereby preventing each clamping piece 2 from offset.

Figure 1:
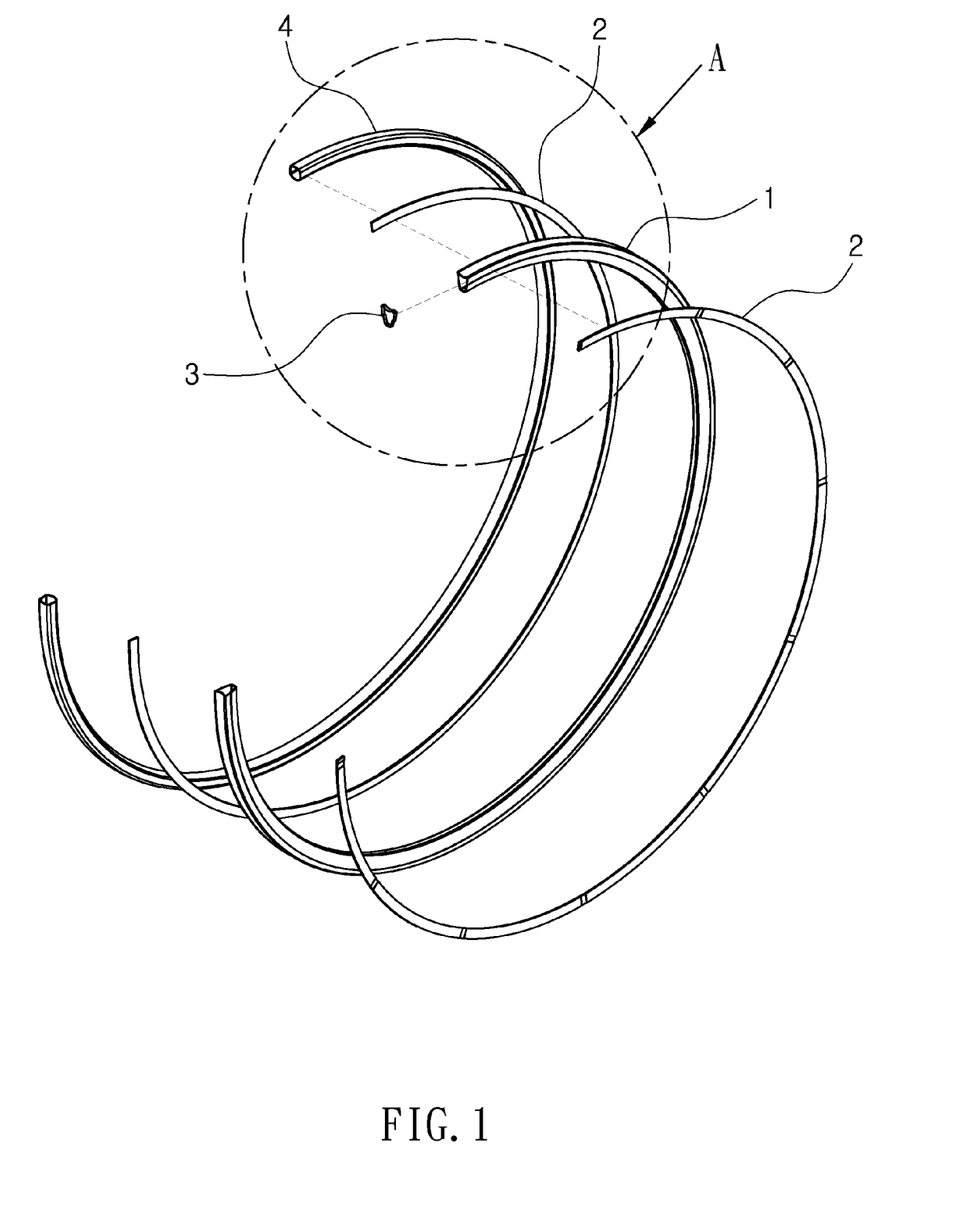
FIG. 1 is a cross-sectional perspective view showing the exploded components of a part of a carbon fiber rim according to a preferred embodiment of the present invention.
Figure 2:
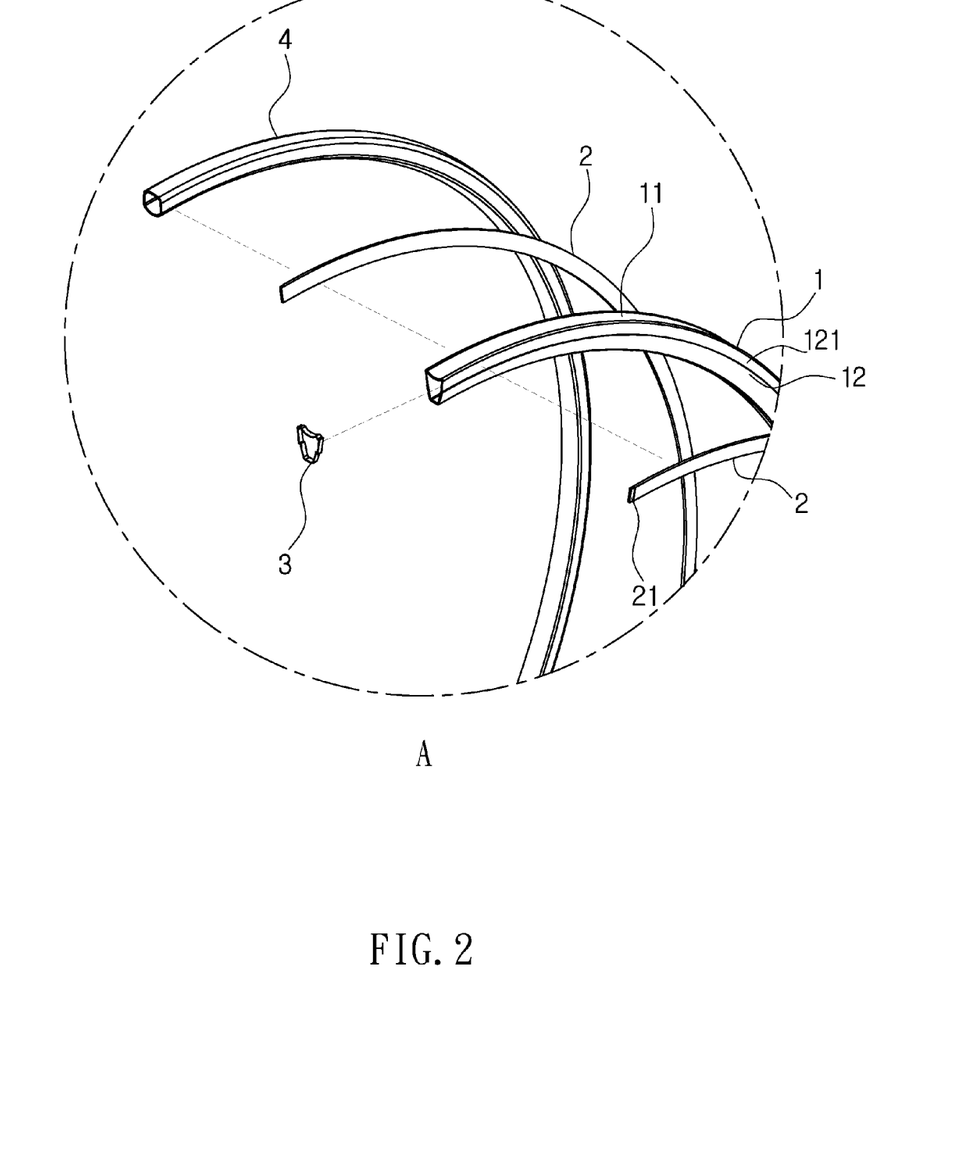
FIG. 2 is an amplified perspective view of a part of A of FIG. 1.
Figure 3:
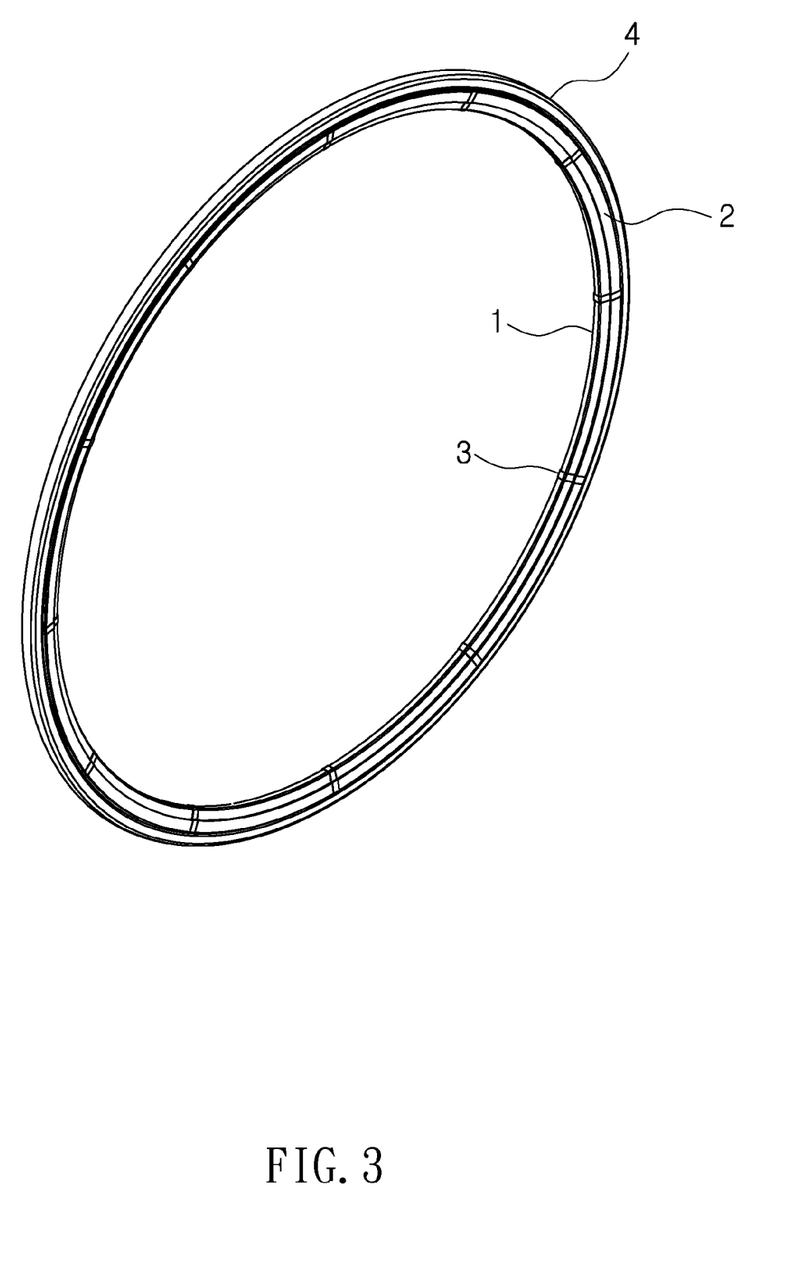
FIG. 3 is a perspective view showing the assembly of the carbon fiber rim according to the preferred embodiment of the present invention.
Figure 4:
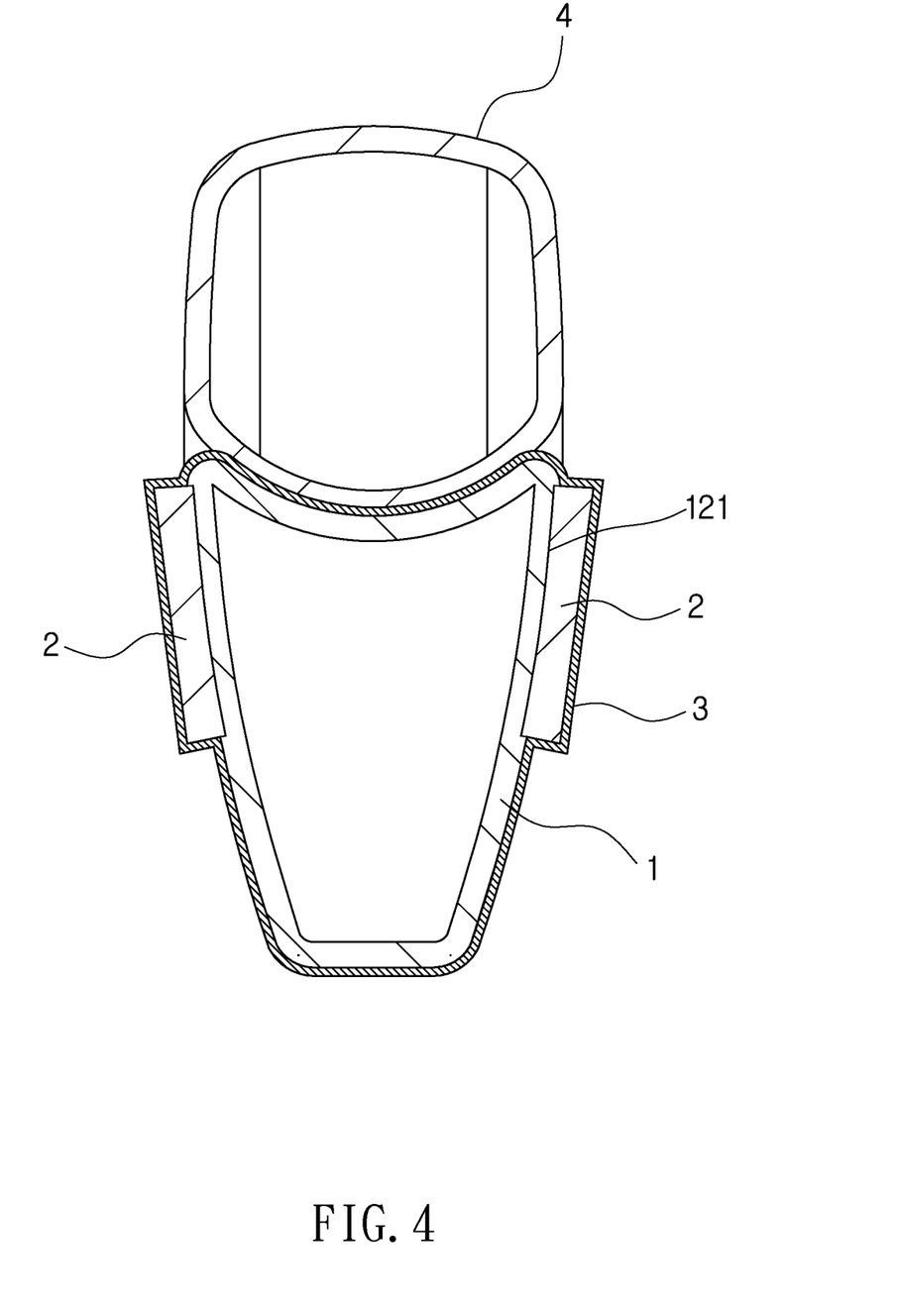
FIG. 4 is a cross sectional view showing the assembly of the carbon fiber rim according to the preferred embodiment of the present invention.
Figure 5:
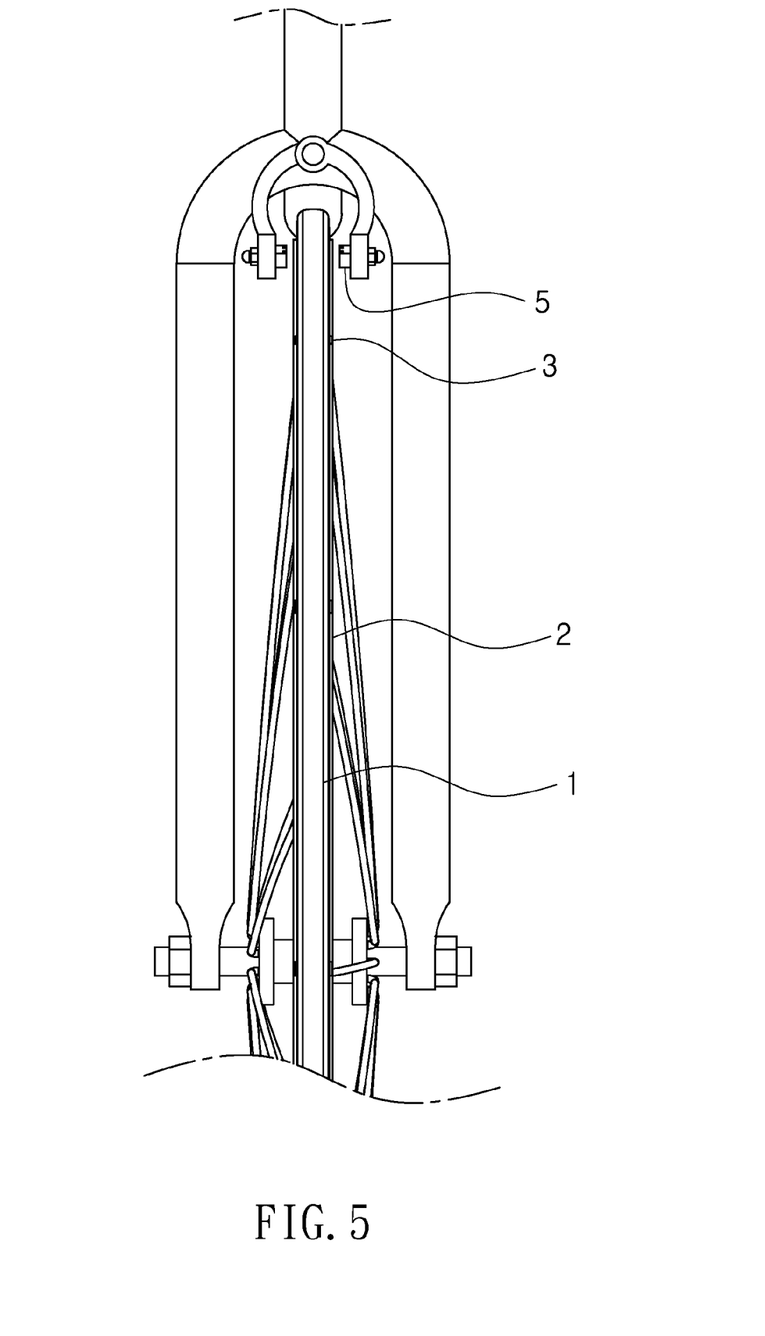
FIG. 5 is a plan view showing the application of the carbon fiber rim according to the preferred embodiment of the present invention.
Figure 6:
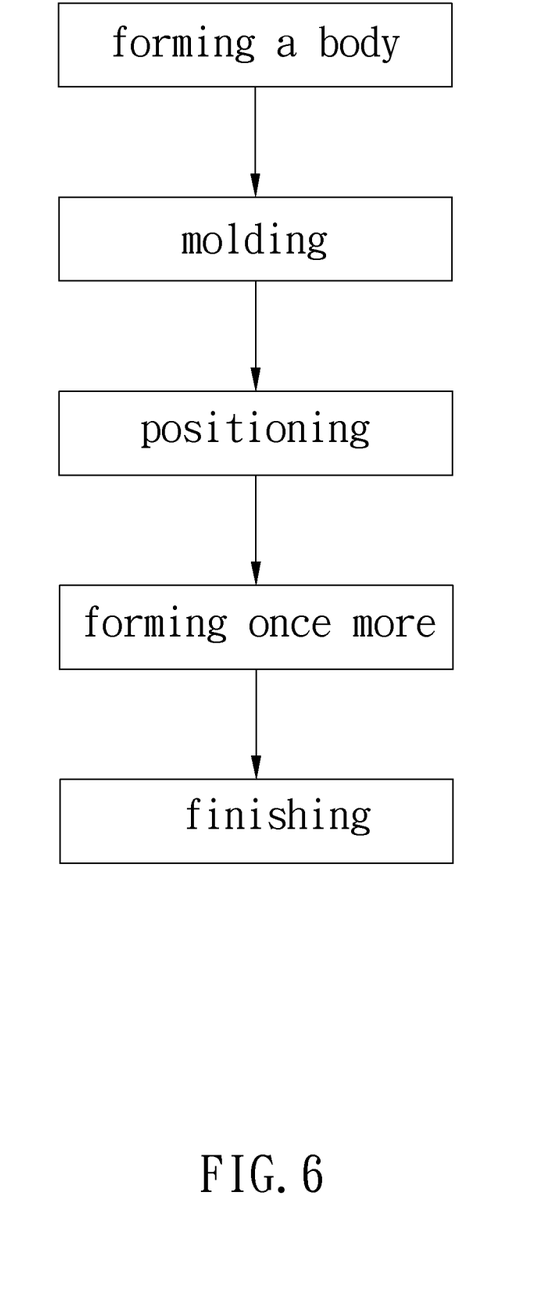
FIG. 6 is flow chart of a method of manufacturing carbon fiber rim according to the preferred embodiment of the present invention.
Figure 7:
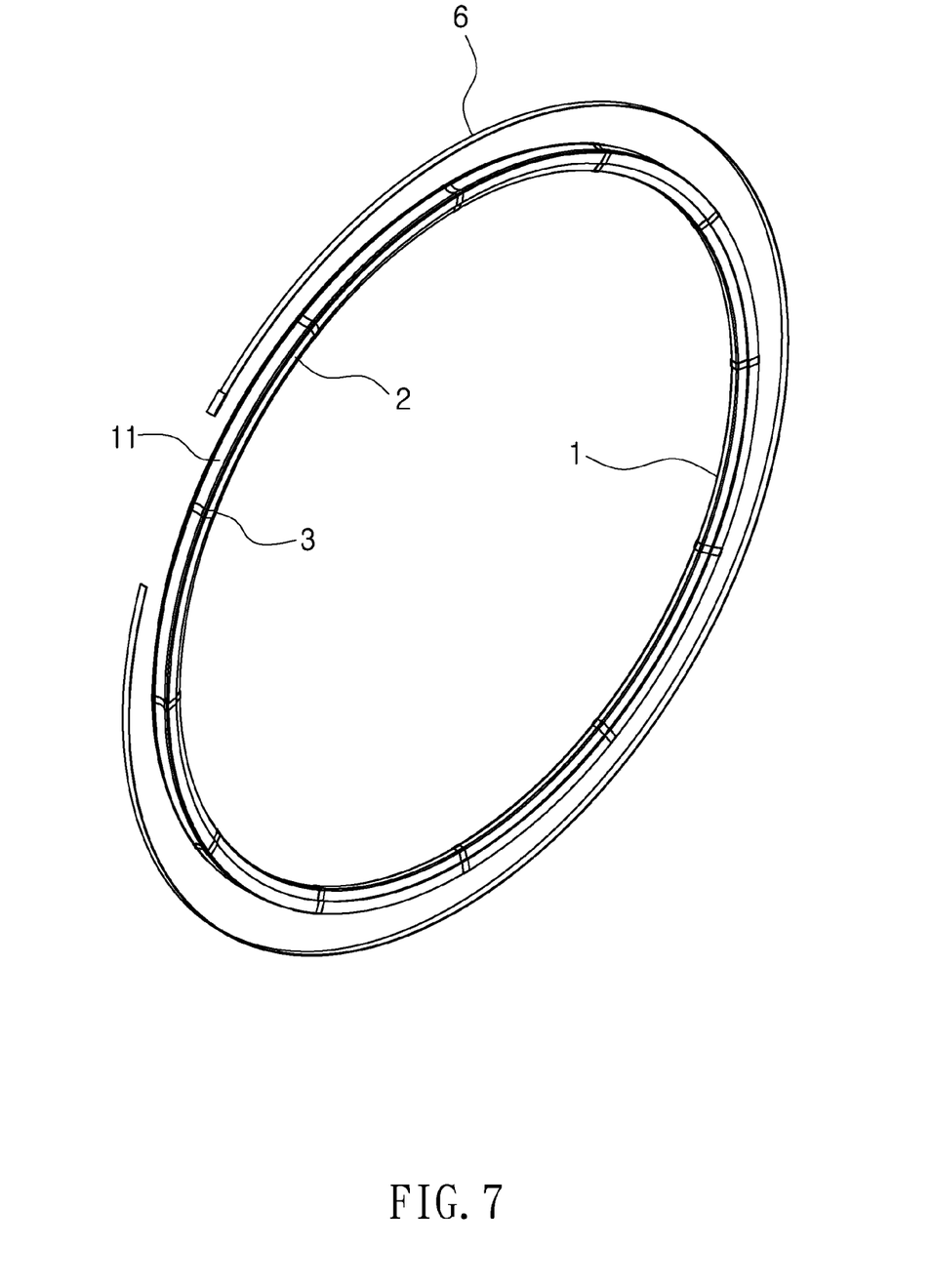
FIG. 7 is a perspective view showing the carbon fiber rim being positioned by a binding ring according to the preferred embodiment of the present invention.
Figure 8:
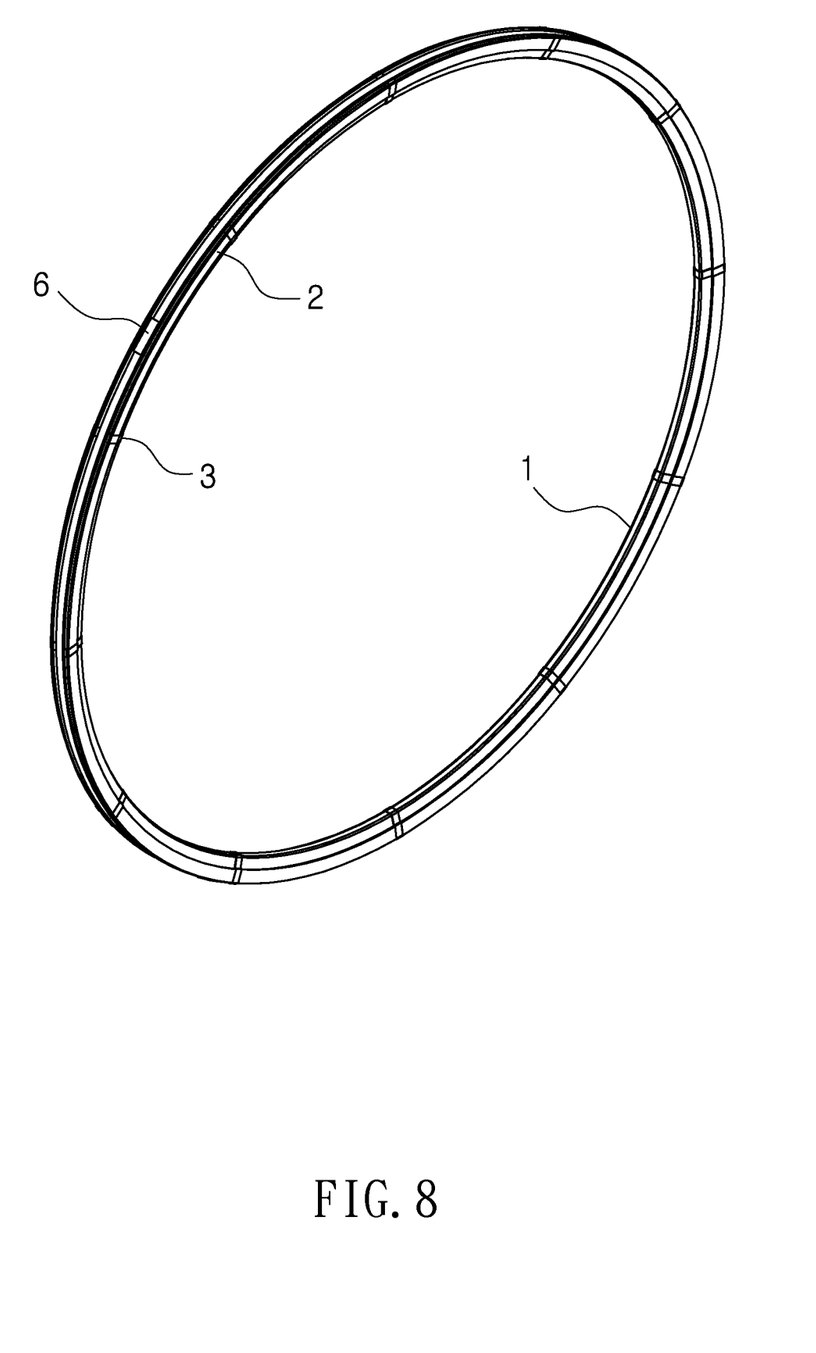
FIG. 8 is another perspective view showing the carbon fiber rim being positioned by the binding ring according to the preferred embodiment of the present invention.

Referring to FIGS. 6-8, a method of manufacturing carbon fiber rim according to the present invention comprises steps of:

forming a body, wherein the body 1 of a carbon fiber rim is formed by a forming machine, and the body 1 includes a recessed fixing face 11 defined on an outer diameter thereof and two connecting faces 12 formed on two sides thereof;

molding, wherein two clamping pieces 2 are aligned with two connecting faces 12 on two sides of the body 1, and a plurality of covering layers 3 are fitted and equidistantly surrounded around the body 1 and the two clamping pieces 2;

positioning, wherein a binding ring 6 is fastened on a recessed fixing face 11 on an outer diameter of the body 1 so that the plurality of covering layers 3 align with plural predetermined positions of each clamping piece 2 (as shown in FIGS. 7 and 8);

forming once more, wherein the plurality of covering layers 3 are microwave heated by a carbon fiber molding machine so that the plurality of covering layers 3 are molded to position the two clamping pieces 2 on the body 1;

finishing, wherein a finished carbon fiber rim is removed from the carbon fiber molding machine, and the binding ring 6 is removed.

Thereby, the two clamping pieces 2 are fixed on the two connecting faces 12 of the body 1 by using the plurality of covering layers 3 so that two brake blocks 5 do not contact the body 1 directly, and the two clamping pieces 2 rub with two brake blocks, thereby braking a bicycle wheel and prolonging service life of the carbon fiber rim.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A carbon fiber rim comprising:
    a body, two clamping pieces, and a plurality of covering layers;
    the body including a recessed fixing face defined on an outer diameter thereof so as to fix a tire and two connecting faces formed on two sides thereof so as to align with the two clamping pieces, and each clamping piece being a circular loop and corresponding to a profile of an outer peripheral side of the body;
    the plurality of covering layers fitted and surround around the body and the two clamping pieces;
    thereby, the two clamping pieces are fixed on the two connecting faces of the body by using the plurality of covering layers so that two brake blocks of a bicycle do not contact with the body directly and brake a bicycle wheel via the two clamping pieces.

2. The carbon fiber rim as claimed in claim 1, wherein each clamping piece includes plural recessed sections for receiving the plurality of covering layers.

3. The carbon fiber rim as claimed in claim 1, wherein each connecting face of the body has a groove defined thereon and corresponding to each clamping piece.

\* \* \* \* \*